March 3, 1970  D. E. BURROUGH ET AL  3,498,398
WINDROWER DRIVE AND CONTROL THEREFOR
Filed May 16, 1968  4 Sheets-Sheet 1

INVENTORS
D. E. BURROUGH
A. E. BREED

INVENTORS
D. E. BURROUGH
A. E. BREED

INVENTORS
D. E. BURROUGH
A. E. BREED

INVENTORS
D. E. BURROUGH
A. E. BREED

United States Patent Office 3,498,398
Patented Mar. 3, 1970

3,498,398
WINDROWER DRIVE AND CONTROL THEREFOR
Donald E. Burrough and Arie Eugene Breed, Ottumwa, Iowa, assignors to Deere & Company, Moline, Ill., a corporation of Delaware
Filed May 16, 1968, Ser. No. 729,740
Int. Cl. B62d 11/02
U.S. Cl. 180—6.66                              6 Claims

ABSTRACT OF THE DISCLOSURE

The propulsion drive for a self-propelled windrower includes a variable-speed belt drive driven by the engine for varying the ground speed of the machine and a pair of identical variable-speed belt drives having reversing mechanisms associated with their outputs and driven by the engine-driven belt drive, the speeds and direction of rotation of the separate reversible drives being separately controlled to steer the machine. The reversing mechanisms utilize bevel-type differential gearing and the separate belt drives are provided with idlers which provide the proper amount of belt tension both in normal operation and when the engine is being used to brake the vehicle.

BACKGROUND OF THE INVENTION

This invention relates to an improved belt-type propulsion drive for an agricultural machine wherein the vehicle is steered by varying the relative speeds and/or direction of rotation of independent drive wheels on opposite sides of the machine, such as in self-propelled windrower or the like.

In such a self-propelled windrower having such variable speed and reversible belt drives for the separate drive wheels, trim steering is accomplished by varying the relative drive ratios between the separate belt drives, while pivot turning is accomplished by stopping one of the wheels and driving the other, so that the machine pivots about the stopped wheel. By driving one of the wheels in a forward direction and the other wheel in a reverse direction, a spin turn can be achieved, wherein the machine pivots about a point between the drive wheels. Thus, this type of steering control provides a wide degree of maneuverability, which is necessary for such a machine.

While it is known to provide separate variable-speed belt drives for the separate wheels and further to provide idlers in the separate belt drives to maintain proper belt tension in the normally slack side of the belt, problems have arisen when the driving force of the belt is reversed, and the usually loaded side of the belt becomes the slack side of the belt. This condition occurs when the driving wheels are driving the engine, which is acting as a brake, such as when the machine is descending a steep hill. Since the ratios in the belt drives control the steering of the machine, the loss of proper belt tension has affected the control of the machine, so that some machines have been difficult to control in steep terrain.

Also, the reversing mechanisms associated with the belt drives have frequently utilized a planetary gear train with separately engageable clutches to vary the driving connections and the output rotation through the gear train. However, such planetary reversing mechanisms have necessarily been of relatively large diameter and have therefore required considerable space. Also, in such planetary reversing mechanisms, the load on one of the clutches exceeds the ouptput torque in one direction of operation.

SUMMARY OF THE INVENTION

According to the present invention, an improved drive system is provided for separately driving the drive wheels of a self-propelled harvesting machine, wherein the machine is steered by separately controlling the speed and direction of rotation of the separate drive wheels. More specifically, the improved drive system features a variable-speed belt drive in each of the separate wheel drives with improved belt idlers for not only maintaining proper belt tension in the normally slack side of the belt but also maintaining proper belt tension in the opposite side of the belt when the driving force through the belt drive is reversed and the engine is acting as a brake, thereby providing positive control over the ratio in the belt drives for proper steering control of the machine regardless of the direction of force transmitted through the belt drives.

Another feature of the belt idler system resides in the provision of a pair of idler sheaves for each belt drive, the individual sheaves acting on opposite sides of the belt but utilizing a common pivot and spring for providing the belt tensioning force.

Also according to the present invention, an improved reversing mechanism is provided in association with the separate belt drives for separately controlling the direction of rotation of the drive wheels. More specifically, the reversing mechanism utilizes bevel-type differential gearing with a pair of associated clutches separately engageable to establish the alternate directions of output rotation, the bevel-type gearing providing a relatively compact reversing mechanism and the clutches being so arranged so that they are subjected only to the output torque.

DESCRIPTION OF THE PREFERRED EMBODIMENT

Figure 1:
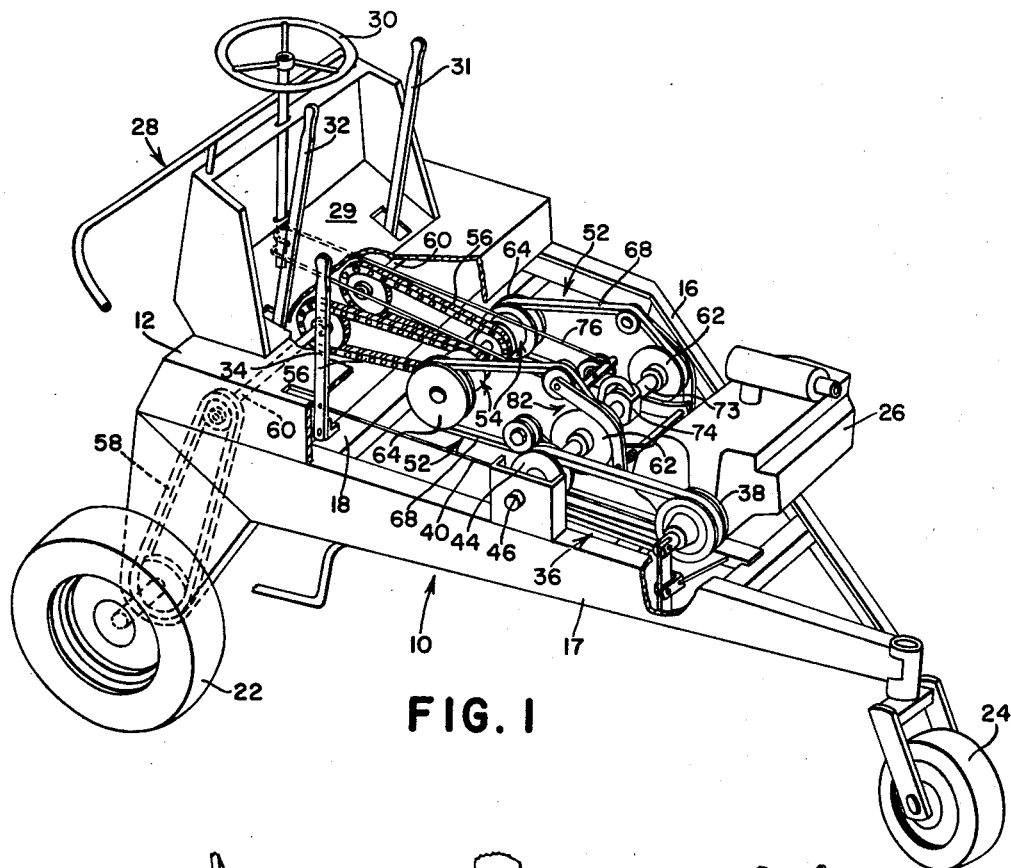
FIG. 1 is a left side top perspective of a windrower traction unit with portions of the operator's station and body removed to show the propulsion drive.
Figure 2:
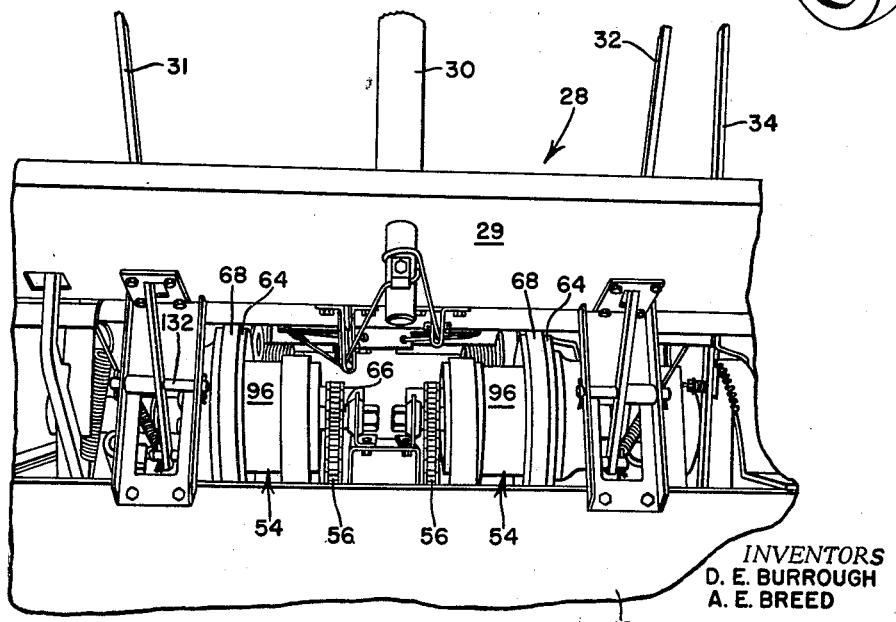
FIG. 2 is a front partial perspective of the windrower, principally showing the separate reversing mechanisms and their associated controls.
Figure 3:
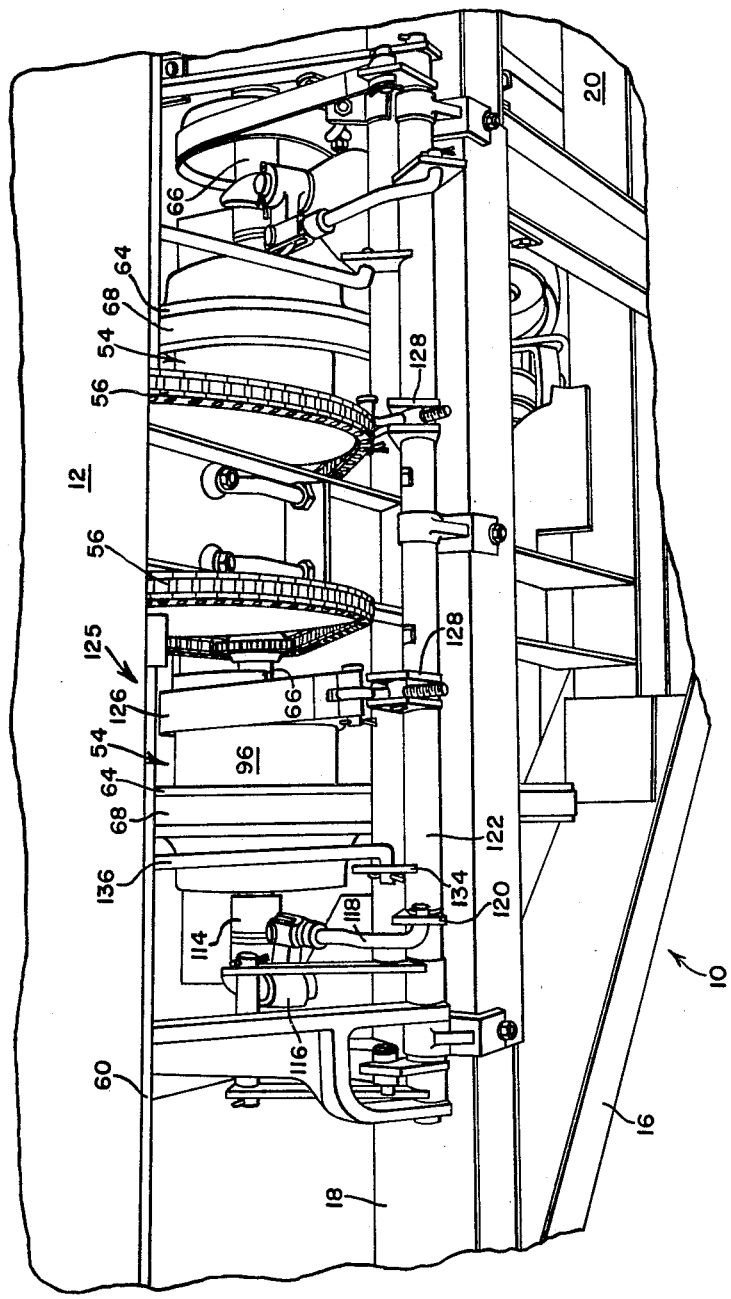
FIG. 3 is a perspective view of the bottom of the windrower viewed from the front of the machine, further showing the reversing mechanisms in the propulsion drive and their associated controls.

The invention is embodied in a self-propelled windrower having a mobile, generally triangular main frame 10 which includes a transverse front portion or member 12, a fore-and-aft channel-shaped beam 14 on its left side and a similar channel-shaped beam 16 on its right side, the forward portion of the right side beam 16 being fore-and-aft while the rearward portion is angled and connected to the rear end of the left side beam 14 to provide the main frame with its generally triangular shape. The frame also includes a transverse box-type beam 18 extending between the opposite side beams and a second transverse beam 20 extending between the side beams rearwardly of the beam 18.

The frame is mounted on a pair of forward independent drive whells 22 at the opposite ends of the front portion or member 12, only the left side wheel 22 being shown in FIG. 1, and is also supported on a rear caster wheel 24 at the juncture of the side beams 14 and 16. A transverse internal-combustion engine 26 is mounted on a rearward portion of the frame rearwardly of a forward elevated operator's station, indicated generally by the numeral 28, most of the operator's station being removed to more clearly disclose the drive system.

The speed and direction of travel of the machine are controlled by the operator by means of a steering wheel 30, right and left steering levers 31 and 32, respectively, and a ground speed control lever 34, all of which are located at the operator's station.

The harvesting apparatus, which are omitted from the drawings, are driven by the engine 26 through a conventional drive system, which is also omitted. The drive wheels 22 are driven by the engine 26 through a drive system, which is also utilized to steer the machine. The drive system includes an infinitely-variable belt-type traction drive 36 driven by the engine and including a variable-diameter drive sheave 38 of conventional construction attached to the engine shaft, the diameter of the sheave 38 and consequently the ratio in the drive 36 being established by means of the ground speed control lever 34, which is connected to the adjustable section of the drive sheave 38 by means of a suitable linkage 40, only a portion of which is shown in FIG. 1. When the control lever 34 is moved forwardly, the adjustable section of the drive sheave 38 is moved toward the opposite or fixed sheave section to increase the diameter of the sheave and thereby increase the ratio in the drive 36. Thus, although the engine is operated at a relatively constant speed, the driven sheave 44 of the drive 36 is driven at varying speeds according to the ratio of the drive. The driven sheave 44 is a variable-diameter sheave of conventional construction, and includes integral spring means for providing the proper belt tension in the drive.

The driven sheave 44 is mounted on and drives a transverse shaft 46, which serves as the input for separate, identical drives 48 and 50, which respectively drive the right and left drive wheels. Each of the wheel drives includes an infinitely-variable belt drive 52 driven by the shaft 46, a reversing mechanism 54 associated with the output of the belt drive 52 to control the direction of rotation of the output, a chain-type intermediate driver 56 driven by the reversing mechanism, and a chain-type final drive 58 driven by the intermediate drive through a transverse shaft 60 and drivingly connected to the respective drive wheel, only the left-hand final drive 58 being shown in FIG. 1.

Figure 6:
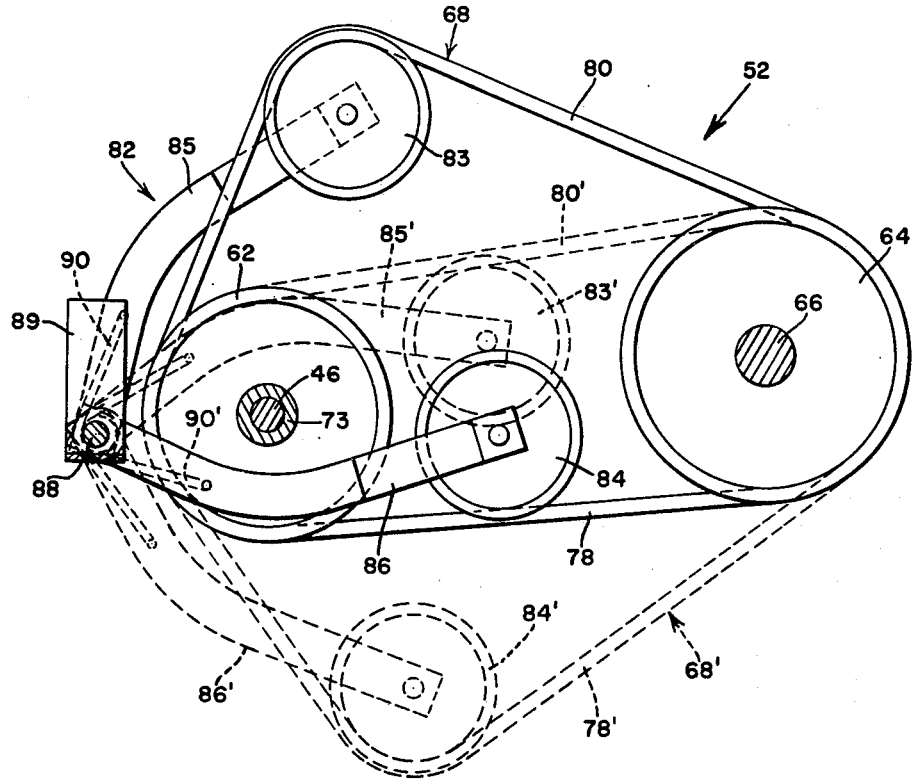
FIG. 6 is an enlarged side elevation view of one of the separate belt drives in the propulsion drive during normal operation of the machine, the alternate configuration of the drive when the force transmitted therethrough is reversed being shown in dotted lines.
Figure 7:
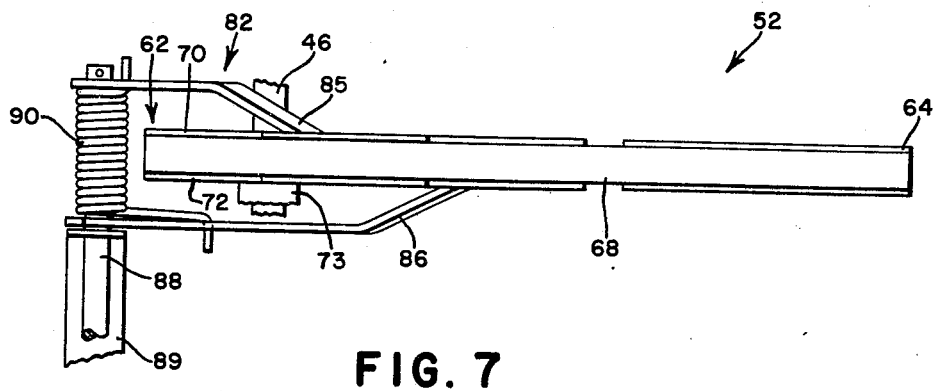
FIG. 7 is a plan view of the belt drive shown in FIG. 6.

Each infinitely-variable belt drive 52 includes a variable-diameter drive sheave 62 mounted on and driven by the transverse shaft 46, a fixed-diameter driven sheave 64 attached to a transverse shaft 66 forwardly of and parallel to the shaft 46, and an endless flexible belt 68 trained around the drive and driven sheaves, the construction of the belt drive being best shown in FIG. 6 and FIG. 7 wherein the left-hand drive 52 is shown in detail. The variable-diameter sheave 62 includes a fixed sheave section 70 and an adjustable sheave section 72, which is axially shiftable relative to the fixed sheave section to vary the diameter of the sheave. The adjustable sheave section is mounted on a sleeve 73 which is coaxially slidable on the shaft 46 between the separate belt drives 52. The adjustable sheave sections 72 in the respective drives are both disposed on the inside of the variable-diameter sheaves and are mounted on the opposite ends of the sleeve 73, so that when the adjustable sheave section in the right-hand drive moves toward its opposite section to increase the diameter of the sheave, the adjustable section in the other belt drive moves away from its fixed sheave section to decrease the effective diameter of the sheave. Thus, the ratios in the separate drives 52 are inversely variable according to the axial position of the sleeve 73, so that when the ratio in one belt drive increases to increase the speed of the drive wheel which it drives, the ratio in the other belt drive decreases a corresponding amount to decrease the speed of the other drive. Thus, by varying the ratios in the two belt drives, and consequently the relative speeds of the drive wheel, the machine can be steered. The position of the sleeve 73, which controls the relative ratios in the drives 52, is controlled by a shifting mechanism 74 actuated by the steering wheel 30 through a steering cable 76, the steering cable and shifting mechanism arangement being of known construction.

In normal operation, the shaft 46 rotates in a clockwise direction, as viewed in FIG. 6, so that the driving force is transmitted to the driven sheave 64 through the lower run 78 of the belt, the upper run 80 of the belt normally being slack and changing in configuration as the diameter of the drive sheave 62 changes. To supply the necessary belt tension in the slack side of the belt, an idler mechanism, indicated generally by the numeral 82, is provided. The idler mechanism includes upper and lower idler sheaves 83 and 84 respectively, which respectively engage the inner surface of the upper and lower runs of the belt. The upper and lower idler sheaves 83 and 84 are respectively mounted at the forward end of upper and lower idler arms 85 and 86, respectively, for rotation about transverse axes parallel to the axis of the drive sheave, the rearward ends of the arms 85 and 86 being coaxially mounted for swinging in a vertical arc on a transverse shaft 88. The shaft 88 is parallel to and rearwardly of the shft 46 and is carried by a bracket 89 attached to the frame. The upper arm 85 is biased upwardly, or in a counterclockwise direction, and the lower arm 86 is biased downwardly, or in a clockwise direction, by a helical-type torsion spring 90 coaxially disposed on the shaft 88 and having one end connected to the upper arm 85 and the other end connected to the lower arm 86. Both arms 85 and 86 are free to swing about the shaft 88 and since the lower run of the belt 78 is normally under tension in excess of the force exerted by the spring 90, the lower idler sheave does not deflect the lower belt run. However, the upper or normally slack run of the belt 80 is normally not under tension so that the torsion spring 90 forces the upper arm 85 upwardly to provide the necessary tension in the upper run of the belt.

When the force transmitted by the belt drive is reversed, and the engine is being utilized to brake the drive wheels, such as when the machine is moving down an incline, the normally driven sheave 64 becomes the drive sheave and transmits a driving force to the sheave 62 and consequently to the engine through the upper run of the belt 80. Since the driving force creates a greater tension on the upper run of the belt than that supplied by the idler mechanism, the upper run of the belt straightens to the position indicated by the numeral 80' in FIG. 6. As a result, the upper idler 83 and its arm 85 swing downwardly to the alternate position indicated by the numerals 83' and 85', while the lower idler 84 and its mounting arm 86 swing downwardly to the new positions indicated by the numerals 84' and 86', deflecting the lower run of the belt 78 to the position indicated by the numeral 78', so that the lower run of the belt is provided with the proper belt tension.

Figure 4:
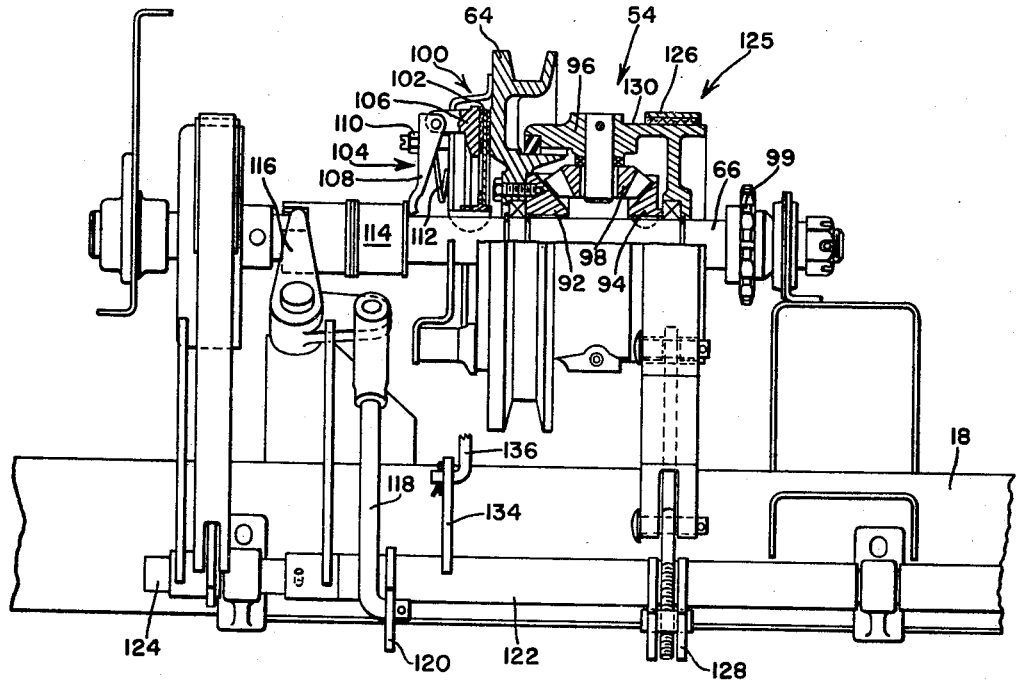
FIG. 4 is a front elevation view of one of the reversing mechanisms and its controls, the reversing mechanism being shown partly in section.

The detailed construction of the reversing mechanism 54 is best shown in FIG. 4 of the drawings, only the reversing mechanism in the right drive 48 being shown. The mechanism 54 includes a bevel gear 92 rotatably mounted on the shaft 66 and coaxially attached to the driven sheave 64 of the previously described belt drive 52. A second bevel gear 94 is keyed to the shaft 66 and spaced from the bevel gear 92 with its gear face facing the gear face of the bevel gear 92. An annular carrier element 96 is coaxially and rotatably mounted on the shaft 66 around the bevel gears 92 and 94 and carries a plurality of bevel gears 98, which are rotatable on the carrier about an axis transverse to the axis of the shaft 66 in constant mesh with the bevel gears 92 and 94, only one of such bevel gears 98 being illustrated in FIG. 4.

The shaft 66 functions as the output of the reversing mechanism and drives a sprocket 99 in the chain-type intermediate drive 56. To drive the shaft 66 in a direction which provides forward movement of the machine, the sheave 64 is connected directly to the shaft 66 by engagement of a forward clutch, indicated in its entirety by the numeral 100. The forward clutch includes a friction element 102 splined to the shaft 66 and engageable with a radial face of the sheave 64, so that when the friction element is pressed into engagement by a clutch-engaging mechanism 104, the shaft 66 is driven in unison with the sheave 64.

The clutch-engaging mechanism 104 includes an annular clutch plate 106 engageable with the friction elements and axially shiftable as a result of the movement of a lever 108 having one end connected to the clutch plate and engaging a fulcrum 110. A clutch spring 112 acts on the lever arm and biases it outwardly against the fulcrum. When the lever arm is positioned flush against the head of the fulcrum 110, as shown in FIG. 4, the clutch is in its engaged position. To disengage the clutch, the inner or free end of the lever arm is shifted inwardly (to the right in FIG. 4) so that the outer end of the lever arm, which is connected to the clutch plate, is shifted outwardly (to the left in FIG. 4), moving the plate 106 outwardly, away from the sheave 64.

The spring 112 biases the lever arm toward its engaged position, and the inner end of the clutch lever is shifted inwardly (to the right in FIG. 4), against the bias of the spring to it disengaged position by a sleeve 114, which is coaxially slidable on the shaft 66 in response to rocking of a bell crank 116, one arm of which engages the sleeve and the other arm of which is connected to a link 118 pivotally connected to a crank arm 120 on a transverse sleeve-like rockshaft 122. The rockshaft 122 is coaxially and rotatably mounted on a transverse shaft 124 mounted on the transverse beam 18.

Figure 5:
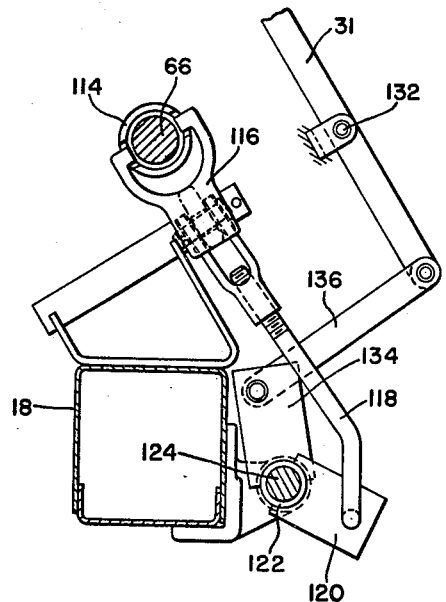
FIG. 5 is a side elevation view of the reversing mechanism controls.

As best seen in FIG. 5, clockwise rotation of the rockshaft shifts the link 118 downwardly, and, as seen in FIG. 4, downward shifting of the link 118 shifts the sleeve 114 to the right to disengage the forward clutch. Conversely, counterclockwise rotation of the rockshaft rocks the bell crank in the oppoiste direction, so that the clutch spring is free to shift the sleeve and the clutch lever to the engaged position shown in FIG. 4.

When the forward clutch is engaged, the input bevel gear 92 is connected to the shaft, and since the output bevel gear 94 is keyed to the shaft, the entire bevel gear train, including the carrier element 96, rotates with the shaft and the sheave 64. With the forward clutch disengaged, the input bevel gear 92 is free to rotate on the shaft, and if the carrier element is also free to rotate, it will rotate and no driving force will be transmitted to the shaft 66, so that the reversing mechanism is in a neutral condition. However, a reverse clutch 125 is engageable to lock the carrier element to the frame, so that the input bevel gear drives the output bevel gear 94 and the shaft 66 connected thereto in the opposite direction through the bevel gears 98 on the carrier. The reverse clutch 125 is formed by a brake band 126 having one end connected to the frame and the other end connected to a crank arm 128 also affixed to the rockshaft 122, so that rotation of the rockshaft in a clockwise direction (as viewed in FIG. 5) pulls the brake band 126 into engagement with an outer cylindrical braking surface 130 on the carrier element 96, thereby preventing the carrier from rotating. Of course, rotation of the rockshaft in the opposite direction disengages the reverse clutch 125.

The position of the rockshaft 122 in the right side drive is controlled by the right steering lever 31, which is swingable in a fore-and-aft are about a transverse pivot 132 spaced a relatively short distance from the lower end of the steering lever. The lower end of the steering lever is connected to the rockshaft 122 by means of a crank arm 134 on the rockshaft and a link 136 interconnecting the crank arm and the steering lever. Of course, an identical control mechanism connects the left-hand steering lever 32 to the reversing mechanism 54 in the left-hand drive.

In operation, the steering levers 31 and 32 can be positioned in three alternate positions. When they are in an intermediate or neutral position, the rockshafts 122 which they control, are so positioned that both the forward clutches 100 and the reverse clutches 125 in the reversing mechanisms are disengaged, so that no driving force is transmitted to the respective drive wheels.

For forward operation of the machine, both steering levers 31 and 32 are shifted forwardly to their forward position, rotating the rockshafts 122 in a counterclockwise direction (as seen in FIG. 5) and thereby permitting the clutch springs to shift the sleeves 114 outwardly and effect an engagement of the forward clutches 100, locking up the reversing mechanisms, so that the shafts 66 are driven in the same direction as the driven sheave 64 for forward rotation of the drive wheel.

In this condition, the speed of the machine is varied by adjusting the ratio in the variable-speed traction drive 36 via the control lever 34. For trim steering of the machine, the operator turns the steering wheel 30 to inversely vary the ratios in the belt drives 52 of the respective right- and left-hand wheel drives 48 and 50, as previously described. For a pivot turn of the machine, the operator simply pulls back one of the steering levers into neutral to disengage both the forward and the reverse clutch in the reversing mechanism on one side of the machine, whereby the drive to one of the wheels is interrupted, so that the machine pivots about the stationary wheel. For a spin turn of the machine, the operator leaves one of the steering control levers in forward, while he pulls the other lever rearwardly through the neutral position to a reverse position. The shifting of the steering lever to the reverse position, of course, rotates the particular rockshaft 122 in a counterclockwise direction so that the forward clutch is first disengaged and the reverse clutch is engaged, whereby one of the wheels is driven in a forward direction while the other is driven in a reverse direction, and the machine spins about a point between the wheels. For reverse operation of the machine, both steering levers 31 and 32 are pulled to their rearwardmost position so that the reverse clutches in both reversing mechanisms are engaged and the machine is driven rearwardly. Steering in the reverse condition is accomplished in the same manner as in the forward drive, the rotation of the steering wheel 30 again inversely varying the output speeds of the separate wheel drives to turn the machine.

As is apparent, the drive is relatively simple and is quite simple to operate. Also, as previously described, the machine can adequately be controlled by means of the steering wheel 30 even when the force transmitted through the drive is reversed.

We claim:

1. In a self-propelled agricultural machine having a main frame mounted on a pair of drive wheels, a power source, and an operator's station, the combination therewith of an improved drive means comprising: a pair of belt drives, each belt drive including a drive sheave, a driven sheave, and a belt drivingly connecting the drive sheave to the driven sheave and having first and second runs which alternately transmit the driving force between the sheaves when the power source is alternately driving or braking the drive wheels; a first connecting means adapted to drivingly connect the power source to the drive sheaves; a second connecting means drivingly connecting the respective driven sheaves to the respective drive wheels; first and second idler sheaves respectively mounted on first and second shiftable mounting structures for respective movement outwardly against and inwardly away from the inner surfaces of the first and second belt runs; and a spring means acting on the respective mounting structures to bias the first idler sheave against the first belt run when the second belt run is transmitting a driving force between the drive and driven sheaves and to bias the second idler sheave against the second belt run when the first belt run is transmitting a driving force between the drive and driven sheaves.

2. The invention defined in claim 1 wherein each mounting structure includes a lever arm mounted for swinging about a common pivot axis parallel to the axis of the driven sheave and rotatably carrying the respective idler sheaves for rotation about axes parallel to one another and said pivot axis, the spring means acting between the lever arms to bias them in opposite directions about their pivot axis.

3. The invention defined in claim 2 wherein said spring means comprises a torsion spring coaxial with said pivot axis and having one end connected to one lever arm and the other end connected to the other lever arm.

4. In a self-propelled agricultural machine having a main frame mounted on first and second laterally spaced independent drive wheels, an operator's station, a power source, and a variable-speed drive means connected to and driven by the power source, the improvement comprising: first and second belt drives respectively driven by the variable-speed drive means and including driven sheaves driven in one direction; first and second reversible drive means, each reversible drive means including a transverse shaft journaled on the main frame, a first bevel gear rotatably mounted on the shaft and connected to and driven by the driven sheave of one of said belt drives, a second bevel gear coaxially attached to the shaft and facing the first bevel gear, a carrier element rotatably mounted on the shaft, and at least one third bevel gear mounted on the carrier element for rotation about an axis normal to the shaft axis and in constant mesh with the first and second bevel gears, a first clutch means engageable to connect the driven sheave to the shaft to drive the shaft in one direction, and a second clutch means engageable when the first clutch means is disengaged to connect the carrier element to the main frame so that the shaft is driven in the opposite direction; a control means associated with the first and second clutch means in each reversible drive for effecting nonconcurrent engagement of the clutch means; and means operatively connecting the shafts of the respective reversible drives to the drive wheels.

5. The invention defined in claim 4 wherein the control means includes first and second manually actuatable control levers at the operator's station, separately actuatable to control the clutch means in the first and second reversible drives respectively, each lever being shiftable from a neutral position wherein neither clutch means is engaged, to forward and reverse positions wherein the first and second clutch means are respectively engaged.

6. The invention defined in claim 4 wherein each belt drive includes a drive sheave, a driven sheave, and a belt drivingly connecting the drive sheave to the driven sheave and having first and second runs which alternately transmit the driving force between the sheaves when the power source is alternately driving or braking the drive wheels, a first connecting means adapted to drivingly connect the power source to the drive sheaves; a second connecting means drivingly connecting the respective driven sheaves to the respective drive wheels; and an idler means associated with each variable-speed drive and adapted to engage either run of the belt to apply a belt tensioning force thereto when the opposite run of the belt is transmitting the driving force between the sheaves.

References Cited

UNITED STATES PATENTS

| | | | |
|---|---|---|---|
| 529,268 | 11/1894 | Hopkirk | 74—242.11 X |
| 1,906,790 | 5/1933 | Greve | 74—780 X |
| 2,714,826 | 8/1955 | Jasper | 180—6.66 X |
| 2,936,840 | 5/1960 | White | 180—6.66 |
| 3,319,493 | 5/1967 | Halls et al. | 180—6.66 X |

LEO FRAGLIA, Primary Examiner

J. A. PEKAR, Assistant Examiner

U.S. Cl. X.R.

74—230.17, 665, 722